United States Patent
Lee et al.

(10) Patent No.: US 9,052,719 B2
(45) Date of Patent: Jun. 9, 2015

(54) ROBOT CLEANER AND CONTROLLING METHOD OF THE SAME

(75) Inventors: Seongsu Lee, Seoul (KR); Yiebin Kim, Seoul (KR); Suuk Choe, Seoul (KR); Donghoon Yi, Seoul (KR); Seungmin Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 593 days.

(21) Appl. No.: 13/281,018

(22) Filed: Oct. 25, 2011

(65) Prior Publication Data

US 2012/0109376 A1 May 3, 2012

(30) Foreign Application Priority Data

Oct. 28, 2010 (KR) .................. 10-2010-0106246

(51) Int. Cl.
*G05B 15/00* (2006.01)
*G05D 1/02* (2006.01)

(52) U.S. Cl.
CPC ............ *G05D 1/0246* (2013.01); *G05D 1/0227* (2013.01); *G05D 1/024* (2013.01); *G05D 1/0242* (2013.01); *G05D 1/0255* (2013.01); *G05D 1/0257* (2013.01); *G05D 1/027* (2013.01); *G05D 1/0272* (2013.01); *G05D 1/0274* (2013.01); *G05D 2201/0203* (2013.01); *G05D 2201/0215* (2013.01)

(58) Field of Classification Search
USPC ........ 700/245, 259, 250, 253; 901/47; 15/319
See application file for complete search history.

(56) References Cited

U.S. PATENT DOCUMENTS

| | | | | |
|---|---|---|---|---|
| 5,646,494 | A * | 7/1997 | Han | 318/587 |
| 6,748,297 | B2 * | 6/2004 | Song et al. | 700/259 |
| 7,706,917 | B1 * | 4/2010 | Chiappetta et al. | 700/245 |
| 7,831,094 | B2 * | 11/2010 | Gupta et al. | 382/190 |
| 8,010,229 | B2 * | 8/2011 | Kim et al. | 700/245 |
| 2004/0128031 | A1 * | 7/2004 | Wang, II | 700/258 |
| 2004/0210343 | A1 * | 10/2004 | Kim et al. | 700/245 |
| 2005/0137749 | A1 * | 6/2005 | Jeon et al. | 700/245 |
| 2005/0288079 | A1 * | 12/2005 | Tani | 463/1 |
| 2006/0076039 | A1 * | 4/2006 | Song et al. | 134/21 |
| 2006/0076917 | A1 * | 4/2006 | Lim et al. | 318/568.12 |
| 2006/0100742 | A1 * | 5/2006 | Park | 700/259 |
| 2008/0065267 | A1 * | 3/2008 | Hong et al. | 700/245 |
| 2009/0055020 | A1 * | 2/2009 | Jeong et al. | 700/251 |
| 2009/0210092 | A1 * | 8/2009 | Park et al. | 700/259 |
| 2009/0281661 | A1 * | 11/2009 | Dooley et al. | 700/258 |

(Continued)

OTHER PUBLICATIONS

Se et al., Vision-Based Global Localization and Mapping for Mobile Robots, Jun. 2005, IEEE.*

*Primary Examiner* — Russell Frejd
*Assistant Examiner* — Sara Nelson
(74) *Attorney, Agent, or Firm* — McKenna Long & Aldridge LLP

(57) ABSTRACT

Disclosed are a robot cleaner and a method for controlling the same. The robot cleaner may prevent repeated executions of a cleaning operation by recognizing its position through an absolute position recognition unit, in a case that the cleaning operation is performed again after being forcibly stopped due to arbitrary causes. And, the robot cleaner may solve a position recognition error by a relative position recognition unit with using an image detection unit, and may effectively perform a cleaning operation based on a similarity between an image detected by the image detection unit and an image with respect to a cleaning region. This may improve the system efficiency and stability, and enhance a user's convenience.

12 Claims, 6 Drawing Sheets

(56) References Cited

U.S. PATENT DOCUMENTS

| | | | |
|---|---|---|---|
| 2010/0094460 A1* | 4/2010 | Choi et al. | 700/251 |
| 2010/0174409 A1* | 7/2010 | Park et al. | 700/259 |
| 2010/0228394 A1* | 9/2010 | Yi et al. | 700/253 |
| 2011/0038540 A1* | 2/2011 | Ahn et al. | 382/173 |
| 2012/0297559 A1* | 11/2012 | Lee et al. | 15/3 |
| 2013/0138247 A1* | 5/2013 | Gutmann et al. | 700/253 |

\* cited by examiner

ROBOT CLEANER AND CONTROLLING METHOD OF THE SAME

CROSS-REFERENCE TO RELATED APPLICATION

This application claims the benefit of Korean Patent Application No. 10-2010-0106246, filed on Oct. 28, 2010, which is hereby incorporated by reference for all purposes as if fully set forth herein.

BACKGROUND OF THE INVENTION

1. Field of the Invention

This specification relates to a robot cleaner capable of precisely recognizing its position with using an upper camera, and a controlling method of the same.

2. Background of the Invention

Generally, a robot has been developed for an industrial use, and has managed some parts of factory automation. As the robot is applied to various fields recently, medical robots, space robots, home robots, etc. are being developed.

A representative of the home robot is a robot cleaner, a kind of home electronic appliance capable of performing a cleaning operation by sucking peripheral dust or foreign materials with autonomously moving on a predetermined region. This robot cleaner is provided with a chargeable battery, and is provided with an obstacle sensor for avoiding an obstacle while moving.

In order for the robot cleaner to clean all regions while autonomously moving, a cleaning map has to be made, and a cleaning region on the cleaning map has to be categorized into a region to be cleaned or a region having been cleaned. This determination is generally performed by a precise control performance of the robot cleaner.

While the robot cleaner performs a cleaning operation, may occur a mechanical problem such as wheel detachment or a user's intervention such as a dust box replacement and a rag (dust cloth) replacement. This may result in a forcible stopping of the cleaning operation. In this case, the robot cleaner may not recognize its position even if it re-starts to perform the cleaning operation after the causes of the stopping of the cleaning operation have been removed. Most of users remove the causes of the stopping of the cleaning operation, and then puts the robot cleaner on an arbitrary position. Then, the users press a cleaning start button. In this case, the robot cleaner having a relative position recognition sensor has a difficulty in recognizing its current position. As a result, the robot cleaner is not capable of distinguishing a cleaned region and a non-cleaned region from each other. This may cause the robot cleaner to repeatedly perform a cleaning operation on a cleaned region, or to re-start to perform a cleaning operation based on its current position.

SUMMARY OF THE INVENTION

Therefore, an aspect of the detailed description is to provide a robot cleaner capable of preventing repeated executions of a cleaning operation by recognizing its position through an absolute position recognition unit, in a case that the cleaning operation is performed again after being forcibly stopped due to arbitrary causes, and a controlling method of the same.

Another aspect of the detailed description is to provide a robot cleaner capable of solving a position recognition error by a relative position recognition unit with using an image detection unit, and capable of effectively performing a cleaning operation based on a similarity between an image detected by the image detection unit and an image with respect to a cleaning region, and a controlling method of the same.

To achieve these and other advantages and in accordance with the purpose of this specification, as embodied and broadly described herein, there is provided a robot cleaner, including: a detection unit to detect structures within a cleaning region; a storage unit to store information regarding the detected structures; and a control unit to compare information regarding the structures detected by the detection unit after a stopped cleaning operation is restarted with structure information stored in the storage unit before the cleaning operation was stopped, and to initiate a cleaning operation with respect to the cleaning region by recognizing an absolute position of the robot cleaner based on the comparison.

The robot cleaner may include an image detection unit to capture images of structures within a cleaning region; a storage unit to store image information regarding the captured images and to store information of a cleaned region and a non-cleaned region; and a control unit to compare the image information stored in the storage unit before a cleaning operation was stopped with image information of images captured by the image detection unit after the stopped cleaning operation was restarted, and to initiate a cleaning operation with respect to the non-cleaned region based on the comparison.

The control unit may include a feature point extraction module configured to extract feature points from the image information stored in the storage unit before stopping the cleaning operation, and from the image information detected by the image detection unit after re-starting the cleaning operation; a similarity calculation module configured to calculate each similarity between the feature points; and a position recognition module configured to recognize a position of the robot cleaner based on a comparison result between the similarities.

The control unit may further include a region determination module configured to determine whether a cleaning region on a position recognized by the position recognition module is a non-cleaned region; and a control module configured to perform a cleaning operation with respect to the non-cleaned region based on a determination result by the region determination module.

To achieve these and other advantages and in accordance with the purpose of this specification, as embodied and broadly described herein, there is also provided a method for controlling a robot cleaner, the method including: detecting one or more structures within a cleaning region before a cleaning operation is stopped; storing information regarding the detected structures; detecting one or more structures within the cleaning region after the stopped cleaning operation is re-started; comparing the information regarding the structures detected after the stopped cleaning operation is re-started with the stored structure information; and recognizing an absolute position of the robot cleaner based the comparison.

In the present invention, the robot cleaner may recognize its position through an absolute position recognition unit in a case that a cleaning operation is forcibly stopped due to arbitrary causes, and then the cleaning operation is performed again. This may prevent the cleaning operation from being performed repeatedly.

In the present invention, a position recognition error by a relative position recognition unit may be solved by using the image detection unit.

In the present invention, a cleaning operation may be performed based on a similarity between an image detected by the image detection unit, and an image with respect to a cleaning region. This may improve the system efficiency and stability, and enhance a user's convenience.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
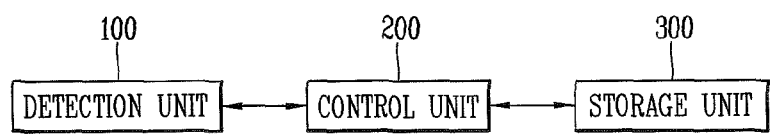
FIGS. 1 and 2 are block diagrams schematically illustrating a configuration of a robot cleaner according to preferred embodiments of the present invention.

Referring to FIG. 1, a robot cleaner according to one embodiment of the present invention comprises a detection unit 100, a control unit 200 and a storage unit 300. The detection unit 100 detects structures within a cleaning region. The storage unit 300 stores information regarding the detected structures. And, the control unit 200 compares information regarding the structures detected by the detection unit after a stopped cleaning operation is restarted with structure information stored in the storage unit before the cleaning operation was stopped, and initiates a cleaning operation with respect to the cleaning region by recognizing an absolute position of the robot cleaner based on the comparison.

The structure information includes a ceiling positioned at an upper side, a fluorescent lamp positioned at a front side and an interior structure. Alternatively, the images may include a ceiling disposed at an upper side, a fluorescent lamp disposed at a front side, an interior structure, a wall, etc. The control unit 200 determines whether the cleaning region has been already cleaned by comparing the detected structure information, with the structure information stored in the storage unit before stopping the cleaning operation.

The detection unit 100 is configured to detect structure information within a cleaning region during a cleaning operation or a running operation, and the storage unit 300 is configured to store the structure information. The storage unit 300 may pre-store therein not only the detected structure information, but also the structure information within the cleaning region in the form of database. Then, once the cleaning operation stopped by a user's intention or by other causes is re-started, the detection unit 100 re-detects structure information from a current position where the robot cleaner is placed. The control unit 200 compares the structure information detected by the detection unit 100, with the structure information stored in the storage unit 300. Then, the control unit 200 recognizes a position of the robot cleaner based on a result of the comparison. Here, the position means not a relative position of the robot cleaner measured by a distance sensor (e.g., a gyro sensor, an encoder, etc.), but an absolute position indicating a cleaning region among a plurality of cleaning regions or a room among a plurality of rooms. The storage unit 300 pre-stores therein information on a cleaning operation such as a cleaning path, a cleaning pattern and a cleaning region, and the control unit 200 determines whether a cleaning region on a recognized position is a cleaned region or a non-cleaned region based on the information stored in the storage unit 300.

Figure 2:
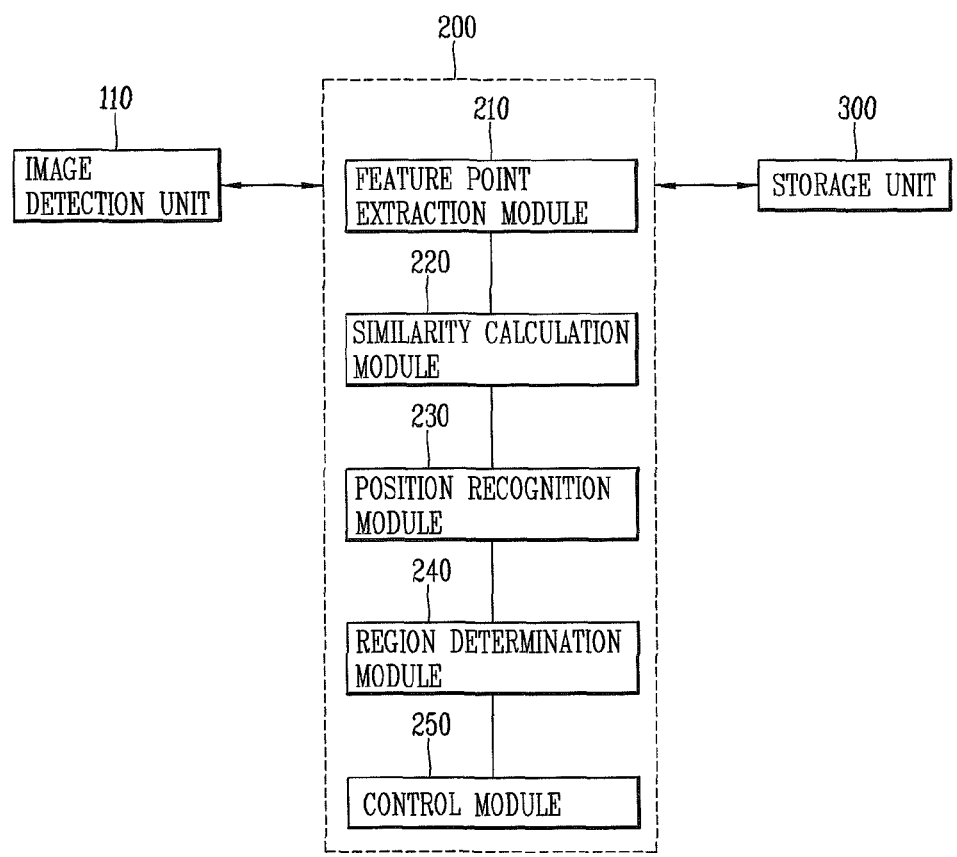

Referring to FIG. 2, the detection unit 100 is an image detection unit 110 configured to detect image information by capturing an upper side or a front side within the cleaning region. The storage unit 300 stores the image information therein.

The image detection unit 110 is implemented as an upper camera installed above the robot cleaner, and configured to detect an upper image by capturing an upper side. Alternatively, the image detection unit 110 may be implemented as a front camera configured to detect a front image by capturing a front side. The image detection unit 110 may include a lens. As the lens, preferably used is a lens having a wide viewing angle so that all regions of an upper side or a front side, e.g., all regions of a ceiling can be captured. For instance, the lens may have a viewing angle more than 160°.

Figure 4:
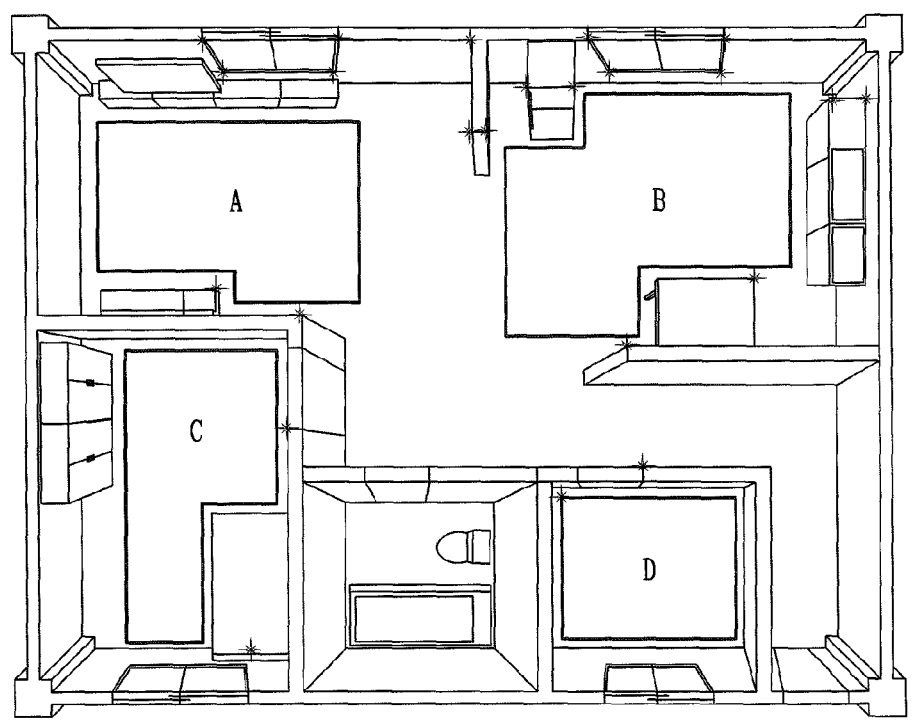
FIG. 4 is a view for explaining an operation to extract feature points by a robot cleaner according to one embodiment of the present invention.

The control unit 200 is configured to extract one or more feature points, from the image information detected by the image detection unit 110 and the image information stored in the storage unit 300. The control unit 200 extracts one or more feature points having coordinate information with respect to each of the plurality of images. Referring to FIG. 4, the feature points indicate natural indicators such as a ceiling of an upper region, a fluorescent lamp of a front region and an interior structure, which are from the image detected by the image detection unit 110. Here, the feature point includes feature point information consisting of a position, an orientation and a descriptor of the feature point on the image, and the descriptor indicates extraction information of the feature point. The descriptor indicates a characteristic of the feature point, which corresponds to a matrix of a predetermined size and including the feature point on the image. The descriptor includes a type or a shape of a structure corresponding to a position extracted from the image.

The control unit 200 calculates a similarity between feature points based on the feature point information, and recognizes an absolute position based on the similarity. The control unit 200 matches feature points with each other by using the image information pre-stored in the storage unit 300, i.e., images or feature points, and the image information detected by the image detection unit 110, and recognizes a position of the robot cleaner. The feature points have a distance therebetween, by which a similarity between the feature points is determined. More concretely, the feature points have a large similarity when a distance therebetween is short. On the other hand, the feature points have a small similarity when a distance therebetween is long. For instance, the feature points may be expressed as $(x_{1,i}, y_{1,i})$ and $(x_{2,i}, y_{2,i})$. Alternatively, the feature points may be expressed as points on a three-dimensional coordinates system. Here, the distance ($\Delta$) between feature points may be represented as the following Equation 1.

$$\Delta=\sqrt{(x_{1,i}-x_{2,i})^2+(y_{1,i}-y_{2,i})^2}$$ [Equation 1]

For instance, when the distance between feature points obtained by the Equation 1 is less than a predetermined value, the control unit 200 determines that the feature points are the same feature point, and matches the feature points with each other.

Figure 3:
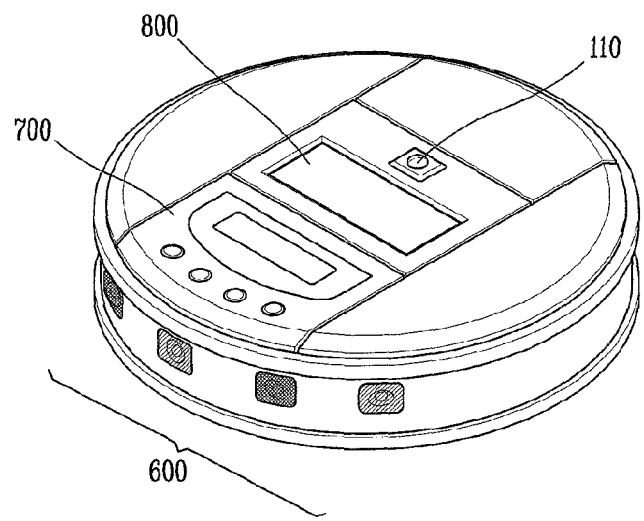
FIG. 3 is a perspective view illustrating the appearance of a robot cleaner according to one embodiment of the present invention.
Figure 5:
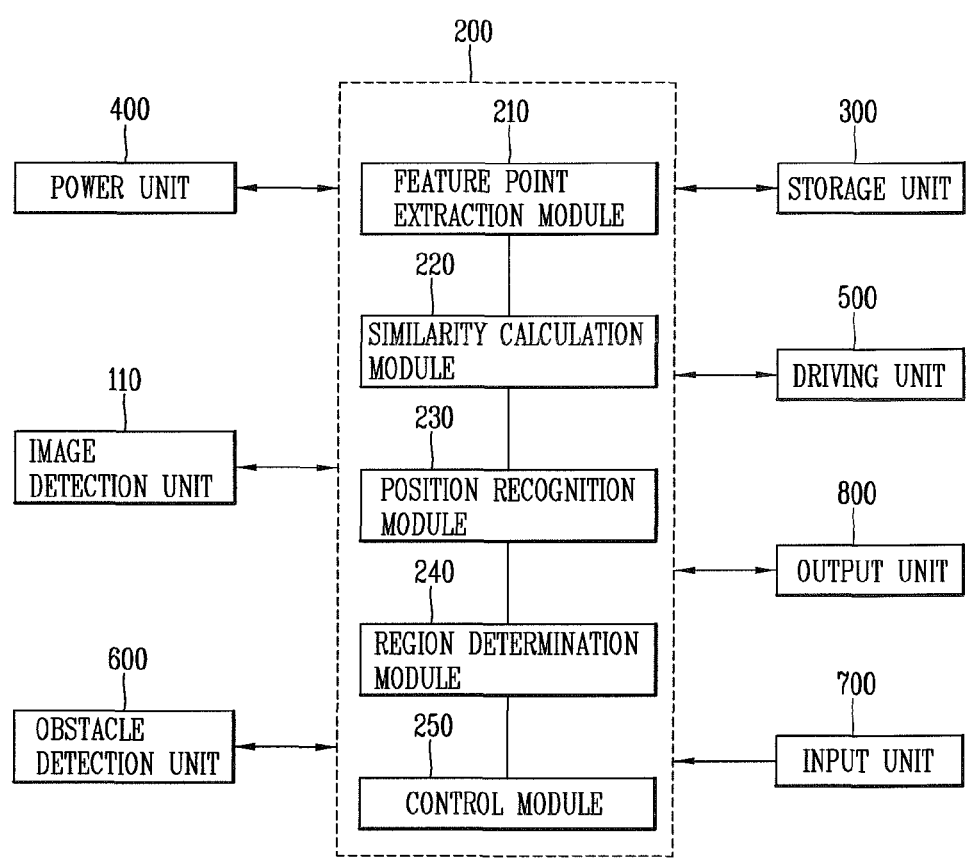
FIG. 5 is a block diagram schematically illustrating a configuration of a robot cleaner according to another preferred embodiment of the present invention.

Referring to FIGS. 3 and 5, a robot cleaner according to another embodiment comprises an image detection unit 110 configured to detect image information by capturing a cleaning region, a storage unit 300 configured to store the image information, a cleaned region and a non-cleaned region, and a control unit 200 configured to compare the image information stored in the storage unit before stopping a cleaning operation, with the image information detected by the image detection unit after re-starting the cleaning operation, and configured to perform a cleaning operation with respect to the non-cleaned region based on a result of the comparison.

The control unit 200 includes a feature point extraction module 210 configured to extract feature points from the image information stored in the storage unit 300 before stopping the cleaning operation, and from the image information detected by the image detection unit 110 after re-starting the cleaning operation, a similarity calculation module 220 configured to calculate each similarity between the feature points, and a position recognition module 230 configured to recognize a position of the robot cleaner based on a comparison result between the similarities.

The control unit 200 further includes a region determination module 240 configured to determine whether a cleaning region on a position recognized by the position recognition module is a non-cleaned region, and a control module 250 configured to perform a cleaning operation with respect to the non-cleaned region based on a determination result by the region determination module.

The feature point extraction module 210, the similarity calculation module 220, the position recognition module 230, the region determination module 240, and the control module 250 may be implemented as different units, or may be implemented as one control unit 200 such as a micro processor.

The image detection unit 110 is implemented as an upper camera installed above the robot cleaner, and configured to detect an upper image by capturing an upper side. Alternatively, the image detection unit 110 is implemented as a front camera configured to detect a front image by capturing a front side. The image detection unit 110 may include a lens. As the lens, preferably used is a lens having a wide viewing angle so that all regions of an upper side or a front side, e.g., all regions of a ceiling can be captured. For instance, the lens may have a viewing angle more than 160°.

The feature point extraction module 210 is configured to extract one or more feature points, from the image information detected by the image detection unit 110 and the image information stored in the storage unit 300. The feature point extract control unit 210 extracts one or more feature points having coordinate information with respect to each of the plurality of images. Referring to FIG. 4, the feature points indicate natural indicators such as a ceiling of an upper region, a fluorescent lamp of a front region and an interior structure, which are from the image detected by the image detection unit 110. Here, the feature point includes feature point information consisting of a position, an orientation and a descriptor of the feature point on the image, and the descriptor indicates extraction information of the feature point. The descriptor indicates a characteristic of the feature point, which corresponds to a matrix of a predetermined size and including the feature point on the image. The descriptor includes a type or a shape of a structure corresponding to a position extracted from the image.

The similarity calculation module 220 calculates a similarity between feature points based on the feature point information, and the position recognition module 230 recognizes an absolute position based on the similarity. The similarity calculation module 220 matches feature points with each other by using the image information pre-stored in the storage unit 300, i.e., images or feature points, and the image information detected by the image detection unit 110. The similarity calculation module 220 calculates a similarity based on the feature point matching. The feature points have a distance therebetween, by which a similarity between the feature points is determined. More concretely, the feature points have a large similarity when a distance therebetween is short. On the other hand, the feature points have a small similarity when a distance therebetween is long.

The image detection unit 110 is configured to detect image information within a cleaning region during a cleaning operation or a running operation, and the storage unit 300 is configured to store the image information. The storage unit 300 may pre-store therein not only the detected image information, but also the image information within a cleaning region in the form of database. Then, once the cleaning operation stopped by a user's intention or by other causes is re-started, the image detection unit 110 re-detects image information from a current position where the robot cleaner is placed. The position recognition module 230 compares the image information detected by the detection unit 110, with the image information stored in the storage unit 300. Then, the position recognition module 230 recognizes a position of the robot cleaner based on a result of the comparison. Here, the position means not a relative position of the robot cleaner measured by a distance sensor (e.g., a gyro sensor, an encoder, etc.), but an absolute position indicating a cleaning region among a plurality of cleaning regions or a room among a plurality of rooms. The region determination module 240 is configured to determine whether a cleaning region on an absolute position recognized by the position recognition module 230 has been already cleaned, by comparing the detected image information with the image information stored in the storage unit before stopping the cleaning operation. The storage unit 300 pre-stores therein information on a cleaning operation such as a cleaning path, a cleaning pattern and a cleaning region. And, the region determination module 240 determines whether a cleaning region on an absolute position recognized by the position recognition module 230 is a cleaned region or a non-cleaned region based on the information stored in the storage unit 300.

The robot cleaner according to embodiments of the present invention further comprises a driving unit 500 configured to move the robot cleaner by driving wheels. And, the robot cleaner further comprises a distance sensor connected to the wheels and configured to measure a moving distance. The driving unit 500 moves the robot cleaner by driving a wheel motor for rotating a plurality of main wheels and one or more auxiliary wheels. While the robot cleaner according to preferred embodiments of the present invention performs a running operation or a cleaning operation by the driving unit 500, a plurality of images are detected by the image detection unit 110. As the distance sensor, mainly used is an encoder connected to the wheel motor for driving the wheels of the robot cleaner, and configured to detect a speed. The distance sensor may be implemented as an acceleration sensor configured to recognize a speed and a position of the robot cleaner, a gyro sensor configured to detect a rotation speed of the robot cleaner, etc.

Referring to FIG. 5, the robot cleaner according to preferred embodiments of the present invention further comprises an obstacle detection unit 600 configured to detect a peripheral obstacle. The control module 250 is configured to create a map based on obstacle information acquired through the obstacle detection unit 600, and to establish (set) a cleaning path or a running path based on the map. The control module 250 is configured to correct the cleaning path or the running path based on a recognized position of the robot cleaner, and to perform a cleaning operation based on the corrected cleaning path or to run based on the corrected running path. The obstacle detection unit 600 is configured to detect an obstacle in the vicinity of the robot cleaner while the robot cleaner is moving or is performing a cleaning operation at an indoor room such as a house or an office, and to transmit obstacle information including the existence of an obstacle, a position, a size, etc. to the control module 250. As the obstacle detection unit 600, may be used an infrared ray sensor, a supersonic wave sensor, a radio frequency (RF) sensor, a bumper, etc. Alternatively, the obstacle detection unit 600 may be implemented as a position sensitive device (PSD) sensor capable of precisely calculating a distance with using a supersonic wave sensor or an infrared ray triangulation. The obstacle detection unit 600 may measure a distance between the robot cleaner and a wall surface with using a laser range finder (LRF) for measuring a precise distance by detecting a laser which is reflected after being emitted. Based on the measured distance between the robot cleaner and a wall surface, the obstacle detection unit 600 may detect a type, a position, etc. of the wall surface. Obstacle information acquired through the obstacle detection unit 600 may be stored in the storage unit 300.

The control module 250 may be configured to create a map based on the obstacle information acquired through the obstacle detection unit 600, and to establish (set) a cleaning path or a running path based on the map.

The storage unit 300 may further store therein information on an obstacle detected while the robot cleaner runs or performs a cleaning operation. And, the storage unit 300 may store therein a plurality of images detected by the image detection unit 110, and one or more feature points extracted by the feature point extraction unit 210. The storage unit 300 is preferably implemented as a non-volatile memory. The non-volatile memory (NVM, NVRAM) indicates a storage device capable of maintaining stored information even when no power is supplied. The non-volatile memory includes ROM, a flash memory, a magnetic computer memory device (e.g., hard disk, diskette drive and magnetic tape), an optical disk drive, magnetic RAM (MRAM), phase-change RAM (PRAM), etc. And, the storage unit 300 may further store therein moving information, cleaning information, etc. of the robot cleaner within a cleaning region, and may further include a program for driving the robot cleaner.

The control module 250 may be configured to correct the cleaning path or the running path based on a position recognized through a matching result between feature points, and based on a position verified with using a moving distance, and to perform a cleaning operation based on the corrected cleaning path or to run based on the corrected running path.

The robot cleaner may further include a power unit 400 having a chargeable power supply means and configured to supply power into the robot cleaner. The power unit 400 supplies power necessary for the robot cleaner to move and to perform a cleaning operation. If a current amount remaining in the power supply means (i.e., battery) of the power unit 400 is deficient, the power unit 400 receives a charging current from a charging plate.

The robot cleaner may further include an input unit 700 configured to directly input a control command, or to input a command for instructing output of obstacle information or information stored in the storage unit 300. The input unit 700 may be further provided with at least one input button such as an OK button, a set button, a re-set button, a deletion button, a cleaning start button and a stop button. According to a command inputted through the input button, the robot cleaner performs certification, set, reset, deletion, etc. with respect to information on a position of an obstacle, a position of the robot cleaner, etc., information on feature points, a map, a cleaning path, a cleaning region, a running path, etc.

The robot cleaner may further include an output unit 800 configured to display image information, structure information, feature point information, obstacle information, or a map each stored in the storage unit 300. The output unit 800 may be configured to further display state information including a current state of each component of the robot cleaner, a current cleaning state, etc. The output unit 800 may be implemented as one of a Light Emitting Diode (LED), a Liquid Crystal Display (LCD), a Plasma Display Panel (PDP) and an Organic Light Emitting Diode (OLED).

A user may input a control command through the input unit 700, thereby selecting a sector or a room requiring a cleaning operation from a map displayed on the output unit 800. And, the user may input a control command for establishing (setting) a cleaning pattern, a cleaning order, etc. The input unit 700 and the output unit 800 may be implemented in the form of a touch screen on which both an input and an output can be implemented.

Figure 6:
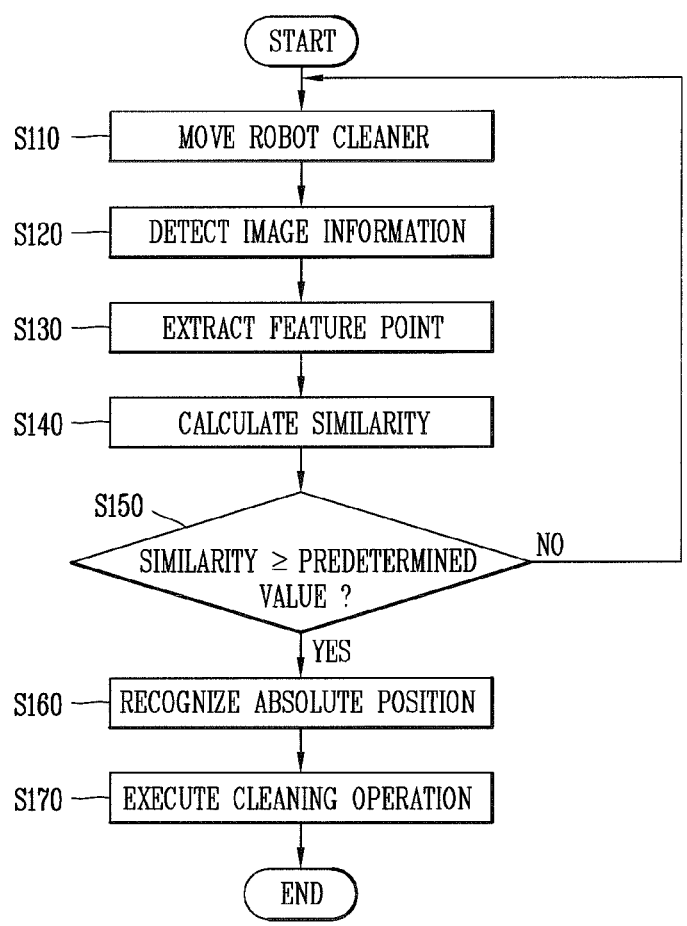
FIGS. 6 to 8 are flowcharts schematically illustrating a method for controlling a robot cleaner according to preferred embodiments of the present invention.

FIG. 6 is a view for explaining an operation to recognize an absolute position of a robot cleaner with using image information, and to perform a cleaning operation according to preferred embodiments.

Referring to FIG. 6, a method for controlling a robot cleaner according to one embodiment of the present invention comprises image detection steps (S110, S120) of detecting image information within a cleaning region while the robot cleaner moves on the cleaning region, a feature point extraction step (S130) of extracting feature points from the image information detected in S120, a similarity calculation step (S140) of calculating each similarity between the feature points, position recognition steps (S150, S160) of recognizing a position of the robot cleaner by comparing the similarities with each other, and a cleaning execution step (S170) of determining whether a cleaning region on a position recognized in S160 is a non-cleaned region, and of executing a cleaning operation with respect to the non-cleaned region based on a result of the determination.

The robot cleaner detects a plurality of image information (S120) through an image detection unit. The image detection unit may be implemented as an upper camera installed above the robot cleaner, and configured to detect an upper image by capturing an upper side. Alternatively, the image detection unit may be implemented as a front camera installed above the robot cleaner, and configured to detect a front image by capturing a front side. Then, the robot cleaner extracts feature points from the plurality of images including a ceiling positioned at an upper side, a fluorescent lamp positioned at a front side and an interior structure (S130). The robot cleaner calculates a distance between feature points to calculate a similarity (S140). Then, the robot cleaner matches the feature points with each other based on the similarity (S150). Here, the distance indicates not a substantial distance, but a distance in a feature point space. The feature points have a large similarity when a distance therebetween is short. On the other hand, the feature points have a small similarity when a distance therebetween is long. The feature point includes feature point information consisting of a position, an orientation and a descriptor of the feature point on the image, and the descriptor indicates extraction information of the feature point. Then, the robot cleaner recognizes its absolute position based on a result of the matching (S160), and determines whether a cleaning region on the recognized absolute position has been already cleaned and performs a cleaning operation (S170). That is, the robot cleaner pre-stores therein cleaning information such as a cleaning path, a cleaning pattern and a cleaning region. Then, based on the cleaning information, the robot cleaner determines whether a cleaning region on the recognized absolute position has been already cleaned or has not been cleaned yet. This may allow the robot cleaner of the present invention to solve a mechanical problem such as wheel detachment or a user's intervention such as a dust box replacement and a rag (dust cloth) replacement. In the conventional art, a cleaning operation may be forcibly stopped due to the mechanical problem or the user's intervention, and a robot cleaner may repeatedly perform the cleaning operation with respect to the same region or may re-start the cleaning operation from the beginning. In the present invention, the robot cleaner performs a cleaning operation with respect to a non-cleaned region. This may enhance the cleaning efficiency.

Figure 7:
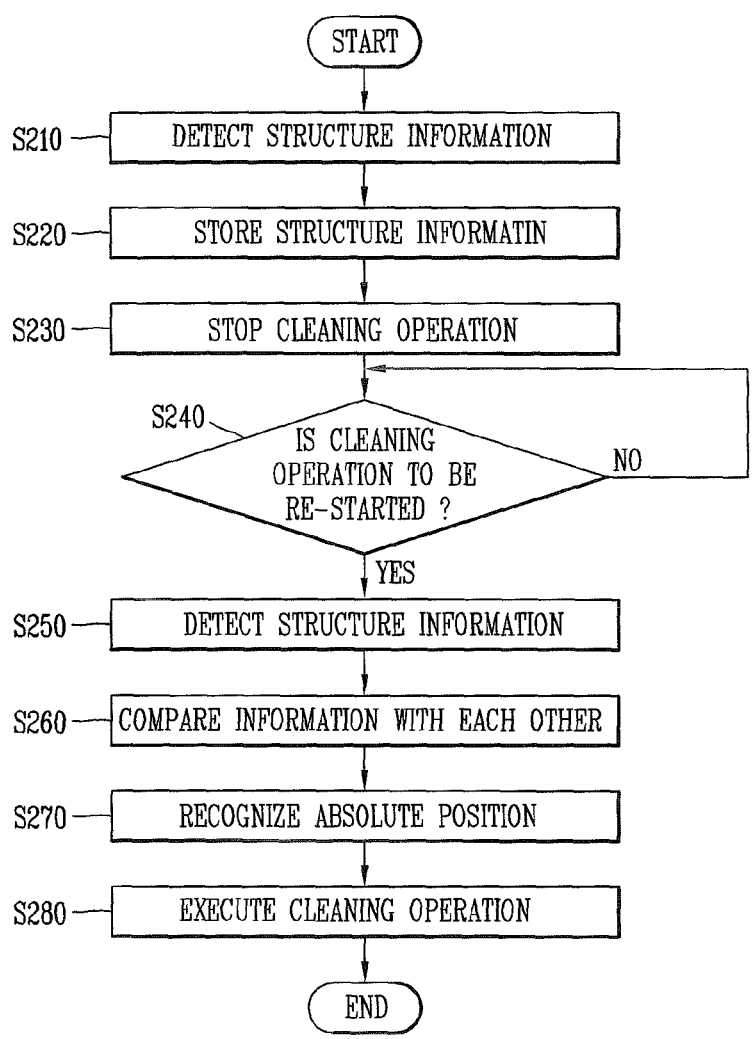

Referring to FIG. 7, a method for controlling a robot cleaner according to another embodiment of the present invention comprises a first detection step (S210) of detecting structure information within a cleaning region, a storage step (S220) of storing the structure information detected in the first detection step, a second detection step (S250) of detecting structure information within the cleaning region after re-starting a cleaning operation, a comparison step (S260) of comparing the structure information detected in the second detection step with the structure information stored in the storage step, a position recognition step (S270) of recognizing an absolute position of the robot cleaner based on a comparison result in the comparison step, and a cleaning execution step (S280) of executing a cleaning operation with respect to the cleaning region based on a recognition result in the position recognition step.

The method for controlling a robot cleaner according to another embodiment of the present invention further comprises a region determination step (not shown) of determining whether the cleaning region has been already cleaned based on a comparison result in the comparison step.

The robot cleaner detects structure information within a cleaning region during a cleaning operation or a running operation (S210), and stores the structure information (S220). The robot cleaner may pre-store therein not only the detected structure information, but also the structure information within the cleaning region in the form of database. Then, once the cleaning operation stopped by a user's intention or by other causes is re-started (S230, S240), the robot cleaner re-detects structure information from a current position where the robot cleaner is placed (S250). The robot cleaner compares the detected structure information with the stored structure information (S260), and recognizes its position based on a result of the comparison (S270). Here, the position means not a relative position of the robot cleaner measured by a distance sensor (e.g., a gyro sensor, an encoder, etc.), but an absolute position indicating a cleaning region among a plurality of cleaning regions or a room among a plurality of rooms. The robot cleaner pre-stores therein information on a cleaning operation such as a cleaning path, a cleaning pattern and a cleaning region, determines whether the cleaning region on the recognized position is a cleaned region or a non-cleaned region based on the stored information, and then performs the cleaning operation (S280).

Figure 8:
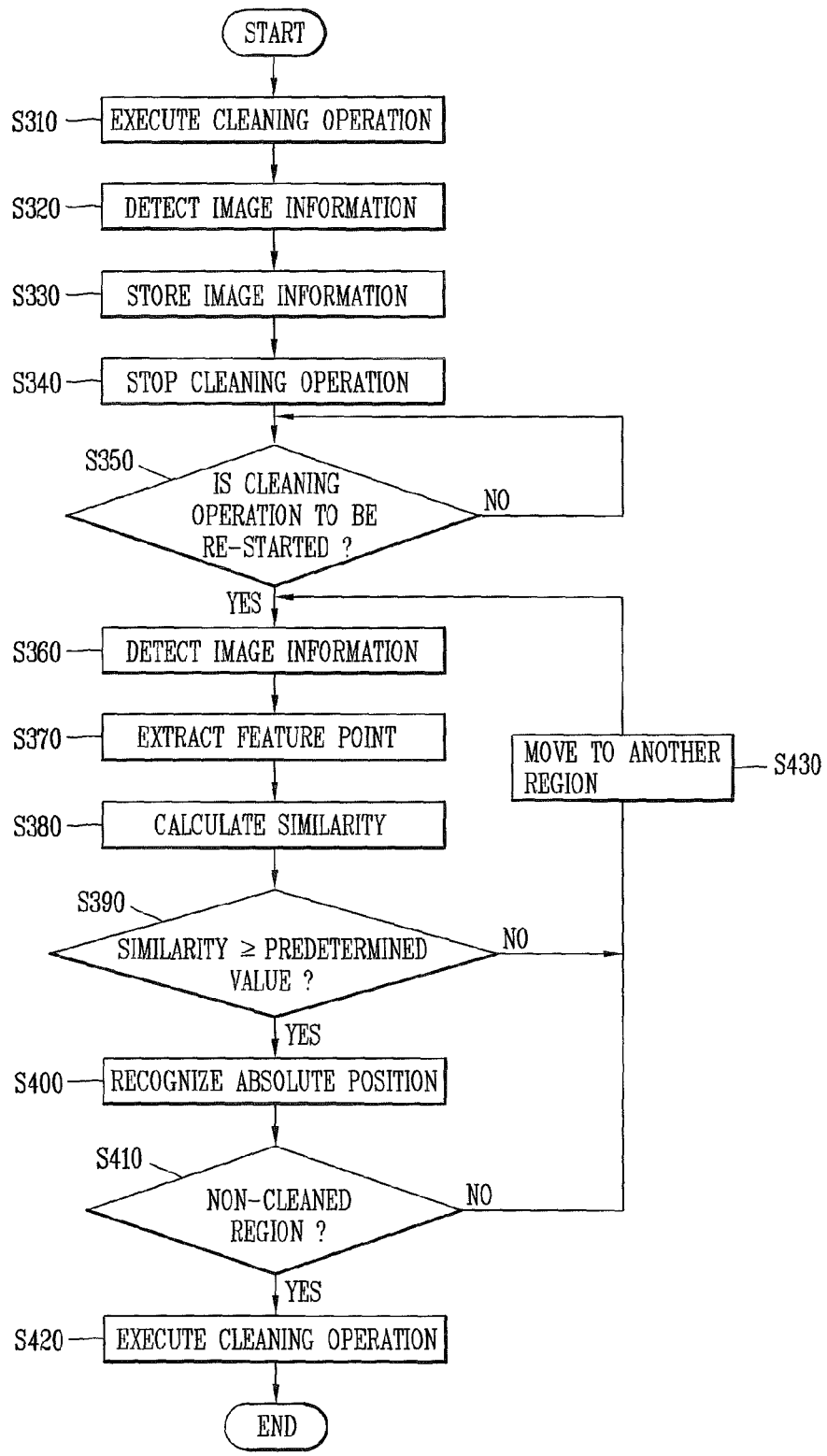

Referring to FIG. 8, a method for controlling a robot cleaner according to still another embodiment of the present invention comprises a first detection step (S310) of detecting image information within a cleaning region, a storage step (S320) of storing the image information detected in the first detection step, a second detection step (S360) of detecting image information within the cleaning region after re-starting a cleaning operation, a feature point extraction step (S370) of extracting one or more feature points from the image information detected in the second detection step and the image information stored in the storage step, a similarity calculation step (S380) of calculating each similarity between the feature points based on feature point information, a similarity comparison step (S390) of comparing the similarities with each other, a position recognition step (S400) of recognizing an absolute position of the robot cleaner based on a comparison result in the comparison step, a region determination step (S410) of determining whether the cleaning region has been already cleaned based on a comparison result in the comparison step, and a cleaning execution step (S420) of executing a cleaning operation with respect to the cleaning region. If the similarity is less than a predetermined value as a result of the comparison or if the recognized position has been already cleaned, the robot cleaner moves to another cleaning region to execute the operations after the second detection step again (S430). The configuration of the robot cleaner will be understood with reference to FIGS. 2 to 5.

The robot cleaner detects image information within a cleaning region during a cleaning operation or a running operation (S310, S320), and stores the image information (S330). Then, once the cleaning operation stopped by a user's intention or by other causes is re-started (S340, S350), the robot cleaner re-detects image information from its position (S360). The robot cleaner compares the detected image with the stored image, and recognizes its position based on a result of the comparison (S370~S400). Here, the position means not a relative position of the robot cleaner measured by a distance sensor (e.g., a gyro sensor, an encoder, etc.), but an absolute position indicating a cleaning region among a plurality of cleaning regions or a room among a plurality of rooms.

The robot cleaner extracts one or more feature points from the detected image information and the stored image information (S370). More concretely, the robot cleaner extracts one or more feature points having coordinate information with respect to each of the plurality of images. Referring to FIG. 4, the feature points indicate natural indicators such as a ceiling of an upper region, a fluorescent lamp of a front region and an interior structure. Here, the feature point includes feature point information consisting of a position, an orientation and a descriptor of the feature point on the image, and the descriptor indicates extraction information of the feature point. The descriptor indicates a characteristic of the feature point, which corresponds to a matrix of a predetermined size and including the feature point on the image. The descriptor includes a type or a shape of a structure corresponding to a position extracted from the image.

The robot cleaner calculates a similarity between feature points based on the feature point information (S380), and recognizes an absolute position based on the similarity (S390, S400). The feature points have a distance therebetween, by which a similarity between the feature points is determined. More concretely, the feature points have a large similarity when a distance therebetween is short. On the other hand, the feature points have a small similarity when a distance therebetween is long. For instance, the feature points may be expressed as $(x_{1,i}, y_{1,i})$ and $(x_{2,i}, y_{2,i})$. Alternatively, the feature points may be expressed as points on a three-dimensional coordinates system. Here, the distance ($\Delta$) between feature points may be represented as the following Equation 2.

$$\Delta = \sqrt{(x_{1,i}-x_{2,i})^2 + (y_{1,i}-y_{2,i})^2} \quad \text{[Equation 2]}$$

For instance, when the distance between feature points obtained by the Equation 2 is less than a predetermined value, the robot cleaner determines that the feature points are the same feature point, and matches the feature points with each other. The robot cleaner recognizes its position based on a result of the matching (S400). And, the robot cleaner compares the detected image information with the image information stored in the storage unit before stopping a cleaning operation, thereby determining whether the cleaning region on a recognized absolute position has been already cleaned (S410). The robot cleaner pre-stores therein information on a cleaning operation such as a cleaning path, a cleaning pattern and a cleaning region, and determines whether the cleaning region on the recognized position is a cleaned region or a non-cleaned region based on the stored information. Then, the robot cleaner executes a cleaning operation with respect to a non-cleaned region (S430). If the similarity is less than a predetermined value and thus the feature points do not match with each other, or if the recognized cleaning region has been already cleaned, the robot cleaner moves to another cleaning region to detect image information again.

As aforementioned, in the robot cleaner and the method for controlling the same according to the present invention, repeated executions of a cleaning operation may be prevented by recognizing a position of the robot cleaner through an absolute position recognition unit, in a case that the cleaning operation is performed again after being forcibly stopped due to arbitrary causes. Furthermore, the robot cleaner may solve a position recognition error by a relative position recognition unit with using an image detection unit, and a cleaning operation may be effectively performed based on a similarity between an image detected by the image detection unit and an image with respect to a cleaning region. This may enhance the system efficiency and stability, and enhance a user's convenience.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A robot cleaner, comprising:
   an image detection unit to capture one or more images within a cleaning region;
   a storage unit to store the captured images with respect to a plurality of cleaning regions; and
   a control unit to compare the captured one or more images by the image detection unit after a stopped cleaning operation is restarted with the captured images with respect to the plurality of cleaning regions stored in the storage unit before the cleaning operation was stopped, and to initiate a cleaning operation with respect to the cleaning region by recognizing an absolute position of the robot cleaner based on the comparison after the robot cleaner has performed in sequence, the sequence comprising:
   (a) stopping the cleaning operation when the cleaning operation is unexpectedly interrupted; and
   (b) receiving a user's input to start cleaning when the robot cleaner is put on an arbitrary position, wherein the arbitrary position is not a position where the robot cleaner has been stopped from the cleaning operation,
   wherein the control unit determines whether the cleaning region is a cleaned region or a non-cleaned region based the comparison, and then the control unit initiates the cleaning operation with respect to the non-cleaned region based on a result of the determination,
   wherein the control unit calculates one or more similarities between the captured one or more images by the image detection unit and the one or more images stored in the storage unit and recognizes the absolute position of the robot cleaner based the calculated similarities,
   wherein if the one or more similarities are less than a predetermined value, then the robot cleaner is moved to another cleaning region to initiate the cleaning operation, and
   wherein the recognized absolute position is a position corresponding to one of the plurality of cleaning regions.

2. The robot cleaner of claim 1, wherein the image detection unit captures one or more images at an upper side or a front side of the robot cleaner.

3. The robot cleaner of claim 1, wherein the control unit comprises:
   a feature point extraction module to extract one or more feature points from image information of the images stored in the storage unit before the cleaning operation was stopped and to extract one or more feature points from the image information of the one or images captured by the image detection unit after the stopped cleaning operation was restarted;
   a similarity calculation module to calculate a similarity between the feature points; and
   a position recognition module to recognize the absolute position of the robot cleaner based on the similarity calculation.

4. The robot cleaner of claim 3, wherein the control unit further comprises:
   a region determination module to determine whether a cleaning region on a position recognized by the position recognition module is a non-cleaned region; and a control module to initiate a cleaning operation with respect to the non-cleaned region based on a determination of the region determination module.

5. The robot cleaner of claim 1, wherein the control unit extracts one or more feature points from image information of the one or more images captured after the stopped cleaning operation was re-started, and wherein the control unit extracts one or more feature points from image information of the images stored in the storage unit before the cleaning operation was stopped.

6. The robot cleaner of claim 5, wherein the feature points comprise feature point information including at least one of a position of the feature point, an orientation of the feature point and a descriptor of the feature point.

7. The robot cleaner of claim 6, wherein when the control unit calculates one or more similarities, the control unit calculates between the one or more feature points from image information of the of the captured images after the stopped cleaning operation was restarted and the one or more feature points from image information stored in the storage unit before the cleaning operation was stopped, wherein the similarities are calculated based on the feature point information of the feature points.

8. A method for controlling a robot cleaner, the method comprising:
    capturing one or more images within each of a plurality of cleaning regions by an image detection unit;
    storing the captured images with respect to the plurality of cleaning regions;
    stopping a cleaning operation when the cleaning operation is unexpectedly interrupted;
    receiving a user's input to start cleaning when the robot cleaner is put on an arbitrary position, wherein the arbitrary position is not a position where the robot cleaner has been stopped from the cleaning operation;
    capturing one or more images within the cleaning region;
    comparing the captured one or more images by the image detection unit after the stopped cleaning operation is re-started with the stored images with respect to the plurality of cleaning regions;
    calculating one or more similarities between the captured one or more images by the image detection unit after the stopped cleaning operation is re-started and the stored images;
    recognizing an absolute position of the robot cleaner based the comparison, wherein the absolute position is a position corresponding to one of the plurality of cleaning regions;
    determining whether the cleaning region is a cleaned region or a non-cleaned region based on the comparison; and
    initiating the cleaning operation with respect to the non-cleaning region based on a result of the determination, wherein if the one or more similarities are less than a predetermined value, then the robot cleaner is moved to another cleaning region to initiate the cleaning operation.

9. The method of claim 8, wherein the captured one images is captured at an upper side or a front side of the robot cleaner.

10. The method of claim 9, further extracting one or more feature points from image information of the one or more images captured after the stopped cleaning operation is restarted and extracting one or more feature points from image information of the images stored before the cleaning operation was stopped.

11. The method of claim 10, wherein the feature points comprise feature point information including at least one of a position of the feature point, an orientation of the feature point and a descriptor of the feature point.

12. The method of claim 11, wherein the calculating one or more similarities is between the one or more feature points from the image information of the captured one or more images after the stopped cleaning operation was restarted and the one or more feature points from the stored image information, wherein the similarities are calculated based on the feature point information.

* * * * *